US010430822B1

(12) United States Patent
Vasquez et al.

(10) Patent No.: US 10,430,822 B1
(45) Date of Patent: Oct. 1, 2019

(54) ADVERTISING AND CUSTOMER LOYALTY SYSTEM

(71) Applicants: Ruby Vasquez, El Paso, TX (US); Steve Vasquez, El Paso, TX (US)

(72) Inventors: Ruby Vasquez, El Paso, TX (US); Steve Vasquez, El Paso, TX (US)

( * ) Notice: Subject to any disclaimer, the term of this patent is extended or adjusted under 35 U.S.C. 154(b) by 111 days.

(21) Appl. No.: 15/697,359

(22) Filed: Sep. 6, 2017

(51) Int. Cl.
*G06Q 30/00* (2012.01)
*G06Q 30/02* (2012.01)

(52) U.S. Cl.
CPC ..... *G06Q 30/0229* (2013.01); *G06Q 30/0233* (2013.01); *G06Q 30/0238* (2013.01); *G06Q 30/0267* (2013.01)

(58) Field of Classification Search
CPC ........... G06Q 30/0229; G06Q 30/0233; G06Q 30/0238
USPC ........................ 705/14.3, 14.33, 14.38, 14.64
See application file for complete search history.

(56) References Cited

U.S. PATENT DOCUMENTS

| | | | | |
|---|---|---|---|---|
| 6,826,540 B1* | 11/2004 | Plantec | .................. | G06Q 30/02 705/7.32 |
| 7,419,093 B1* | 9/2008 | Blackson | ............. | G06Q 20/042 235/375 |
| 8,496,532 B1* | 7/2013 | Bethke | .................. | A63F 13/822 463/42 |
| 9,355,310 B2* | 5/2016 | Carbonell | .......... | G06K 9/00369 |
| 9,374,618 B2* | 6/2016 | Costantino | ....... | H04N 21/44218 |
| 9,420,060 B2* | 8/2016 | Stock | .................... | H04L 67/306 |
| 9,754,441 B1* | 9/2017 | Curtis | ................. | G07F 17/3209 |
| 9,911,133 B1* | 3/2018 | Walbran | ............. | G06Q 30/0226 |
| 10,122,824 B1* | 11/2018 | Chokhawala | ........... | H04L 67/02 |
| 2005/0272494 A1* | 12/2005 | Grinnan | ................. | G06Q 99/00 463/1 |
| 2006/0277098 A1* | 12/2006 | Chung | ................... | G06Q 30/02 705/14.22 |
| 2008/0076538 A1* | 3/2008 | Toyoda | ................... | G07F 17/32 463/25 |
| 2008/0076539 A1* | 3/2008 | Toyoda | ................... | G07F 17/32 463/25 |
| 2008/0120396 A1* | 5/2008 | Jayaram | ................ | G06Q 10/10 709/218 |
| 2008/0167103 A1* | 7/2008 | Okada | ..................... | G07F 17/32 463/11 |

(Continued)

*Primary Examiner* — Luis A Brown
(74) *Attorney, Agent, or Firm* — Gulf Coast Intellectual Property Group (57) ABSTRACT

An advertising and customer loyalty system operable to enhance the relationship between a business and a customer so as to increase revenue for the business. The advertising and customer loyalty system includes a software application operably coupled to a server and a database wherein the software application facilitates the capturing of a photograph at a business registered with the advertising and customer loyalty system. The photograph is captured by a customer registered with the advertising and customer loyalty system and ensuing posting of the photograph by the customer to a social media platform, the business distributes a point. A reward campaign is established by the business wherein ensuing an accumulation of points by a customer, the business will redeem the accumulated points for a reward from the business. An image of the business logo is incorporated into the captured photograph prior to distribution of the photograph.

6 Claims, 7 Drawing Sheets

(56) References Cited

U.S. PATENT DOCUMENTS

| | | | | |
|---|---|---|---|---|
| 2009/0132311 A1* | 5/2009 | Klinger | G06Q 30/02 | 705/7.32 |
| 2009/0182630 A1* | 7/2009 | Otto | G06Q 20/20 | 705/14.1 |
| 2009/0247195 A1* | 10/2009 | Palmer | G06Q 30/02 | 455/466 |
| 2010/0076831 A1* | 3/2010 | Samuel | G06Q 30/02 | 705/14.16 |
| 2010/0137053 A1* | 6/2010 | Blair | G06Q 20/3224 | 463/17 |
| 2010/0223120 A1* | 9/2010 | Dragt | G06Q 30/02 | 705/14.27 |
| 2011/0307318 A1* | 12/2011 | Laporte | G06Q 20/209 | 705/14.33 |
| 2012/0130794 A1* | 5/2012 | Strieder | G06Q 30/02 | 705/14.27 |
| 2012/0170806 A1* | 7/2012 | Ryu | G06K 9/00 | 382/103 |
| 2012/0265544 A1* | 10/2012 | Hwang | G06F 19/3456 | 705/1.1 |
| 2012/0284108 A1* | 11/2012 | Fontana | G06Q 30/0226 | 705/14.27 |
| 2012/0311623 A1* | 12/2012 | Davis | H04N 5/765 | 725/18 |
| 2013/0218608 A1* | 8/2013 | Huson | G06Q 30/0603 | 705/5 |
| 2013/0260727 A1* | 10/2013 | Knudson | G06Q 30/00 | 455/414.1 |
| 2013/0275231 A1* | 10/2013 | Paharia | G06Q 30/0269 | 705/14.66 |
| 2013/0311329 A1* | 11/2013 | Knudson | G06Q 50/01 | 705/26.9 |
| 2013/0347019 A1* | 12/2013 | Herlein | H04N 21/2407 | 725/22 |
| 2014/0025456 A1* | 1/2014 | Reeseroyce | G06Q 30/0279 | 705/14.19 |
| 2014/0100902 A1* | 4/2014 | Godfrey | G06Q 30/06 | 705/7.13 |
| 2014/0136216 A1* | 5/2014 | Beebe | G06Q 40/08 | 705/2 |
| 2014/0156769 A1* | 6/2014 | Wan | H04L 51/32 | 709/206 |
| 2014/0279064 A1* | 9/2014 | Ercanbrack | G06Q 30/0276 | 705/14.72 |
| 2014/0279068 A1* | 9/2014 | Systrom | G06Q 30/0277 | 705/14.73 |
| 2014/0289033 A1* | 9/2014 | Ortigoza | G06Q 50/01 | 705/14.29 |
| 2014/0330729 A1* | 11/2014 | Colangelo | G06Q 20/40145 | 705/72 |
| 2014/0337120 A1* | 11/2014 | Ercanbrack | G06Q 30/0244 | 705/14.43 |
| 2014/0358664 A1* | 12/2014 | Wheeler | G06Q 30/0233 | 705/14.33 |
| 2015/0087369 A1* | 3/2015 | McIntyre | G07F 17/3225 | 463/11 |
| 2015/0093726 A1* | 4/2015 | Duggan | G09B 5/02 | 434/156 |
| 2015/0199700 A1* | 7/2015 | Hanina | H04H 60/32 | 705/14.16 |
| 2015/0302762 A1* | 10/2015 | Sabourian-Tarwe | G09B 7/00 | 434/127 |
| 2016/0210705 A1* | 7/2016 | Florian | G06Q 50/01 | |
| 2016/0234652 A1* | 8/2016 | Chao | H04W 4/043 | |
| 2017/0046723 A1* | 2/2017 | Purcell | G06Q 30/0201 | |
| 2017/0091797 A1* | 3/2017 | Nodera | G06K 7/1417 | |
| 2017/0310888 A1* | 10/2017 | Wright | H04N 5/772 | |
| 2017/0364941 A1* | 12/2017 | Fox | G06Q 30/0235 | |

* cited by examiner

ADVERTISING AND CUSTOMER LOYALTY SYSTEM

PRIORITY UNDER 35 U.S.C. SECTION 119(E) & 37 C.F.R. SECTION 1.78

This nonprovisional application claims priority based upon the following prior United States Provisional Patent Application entitled: Advertising and Customer Loyalty System, Application No. 62/384,673 filed Sep. 7, 2016, in the name of Ruby Vasquez, which is hereby incorporated by reference for all purposes.

FIELD OF THE INVENTION

The present invention relates generally to marketing and advertising systems, more specifically but not by way of limitation, a software application based marketing and advertising system that incorporates utilization of photographic images being linked to GPS coordinates wherein coupons and other loyalty rewards are associated therewith.

BACKGROUND

There are millions of small businesses in the United States. These businesses range from services such as but not limited dry cleaning to restaurants. Depending upon the market, many of these businesses must compete aggressively for customers. Standard methods of attracting customers have been utilized for decades and typically include radio, television and print ads. It is also common practice for business to provide coupons that are made available through coupon books, newspaper and other media. With the proliferation of social media, businesses now must compete and attract customers leveraging the various social media platforms. Social media platforms such as Facebook, Twitter and SnapChat have millions of participants that regularly post short messages that are typically accompanied by photographic images. Social media platforms drive a sense of connectivity that if properly leverage can be utilized by businesses to drive business and customer loyalty.

Conventional loyalty marketing programs utilize loyalty cards and other similar techniques to track, maintain and reward customers for purchases. These programs, while successful, lack the intimacy and immediacy that social media platforms can provide. Over seventy percent of the population now has a smartphone, which are equipped with cameras. Utilization of the camera to send a photographic image of where a person is or what they are doing is very common. Many times these images occur at businesses such as but not limited to restaurants. Conventional marketing methods are unable to leverage the use of photographic images transferred by users of social media.

Accordingly, there is a need for a software application that is operable to integrated with social media platforms wherein the software application will provide image overlays and upon use of the image overlay by a consumer that consumer will receive a loyalty reward to be accumulated for future purchases at the business.

SUMMARY OF THE INVENTION

It is the object of the present invention to provide a customer loyalty program that provides users thereof rewards in exchange for utilization of image overlays.

A further object of the present invention is to provide a software application based customer loyalty program wherein the provider of the loyalty program provides a geographical location of a participating business and transmits to a mobile computing device of a user.

Another object of the present invention is to provide a customer loyalty program that allows users thereof to login into the loyalty program using their social media accounts.

Still a further object of the present invention is to provide a software application based customer loyalty program that provides rewards earned from previous purchases and wherein the loyalty program allows a user to select an image overlay.

An additional object of the present invention is to provide a customer loyalty program wherein the system of the present invention allows users to browse for businesses that are geographically proximate that are members of the loyalty program of the present invention.

An alternative object of the present invention is to provide a software application based customer loyalty program that provides rewards for future purchases wherein the software application of the present invention facilitates the retention and utilization of rewards for each registered consumer.

Another object of the present invention is to provide a customer loyalty and advertising system wherein the software application of the present invention is communicably coupled to a server database that provides storage of data such as but not limited to account information and photographic images.

Still a further object of the present invention is to provide a software application based customer loyalty program that provides rewards earned from previous purchases wherein the software application provides business owners information about the photographic images utilized that incorporate their business.

An additional object of the present invention is to provide a customer loyalty and advertising system wherein the software application leverages a point accumulation system that is to be exchanged for goods, services and/or coupons at participating businesses.

Yet a further object of the present invention is to provide a software application based customer loyalty program that provides rewards earned from previous purchases wherein the software application facilitates the exchange of points for a coupon or reward at a participating business.

An alternative object of the present invention is to provide a customer loyalty and advertising system that includes at least one server communicably coupled to the Internet wherein the server provides operational control of the present invention.

A further object of the present invention is to provide a software application based customer loyalty and advertising system that further includes an operational website wherein businesses and consumers can execute various tasks such as but not limited to registration, view directories and other tasks.

An additional object of the present invention is to provide a software application based customer loyalty program that provides rewards earned from previous purchases wherein the software includes defined administrator levels that provide oversight and execution of the software application of the present invention.

An alternative object of the present invention is to provide a software application based customer loyalty and advertising system wherein the operator of the present invention collects a fee from the enrolled businesses in exchange for participation.

A further object of the present invention is to provide a software application based customer loyalty program that provides rewards earned from previous purchases wherein a registered consumer can view directories such as but not limited to rewards list directory, claimed rewards directory and locations directory.

Yet a further object of the present invention is to provide a software application based customer loyalty and advertising system wherein the software application of the present invention allows registered businesses to provide a plurality of image overlays.

Another object of the present invention is to provide a software application based advertising system having a loyalty program wherein the system further includes the functionality to hold contests and/or an event.

Still a further object of the present invention is to provide a software based advertising system wherein during execution of a contest or event mode the system will include features such as but not limited to: multiple photo perspectives, customizable background, customizable photo filter and social media connectivity.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Referring now to the drawings submitted herewith, wherein various elements depicted therein are not necessarily drawn to scale and wherein through the views and figures like elements are referenced with identical reference numerals, there is illustrated an advertising and customer loyalty system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 1:
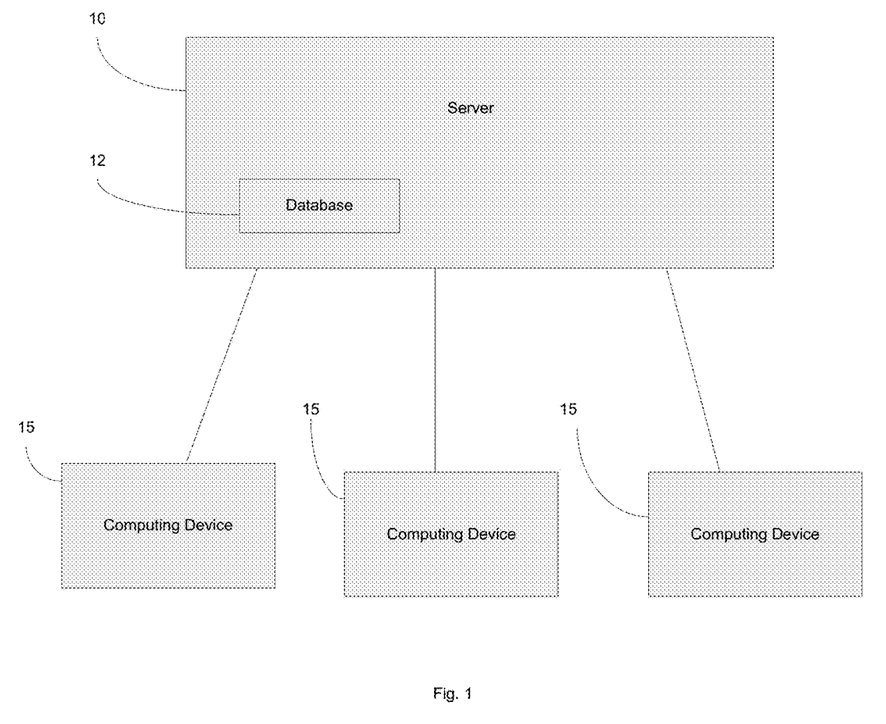
FIG. 1 is a diagrammatic overview of the system components.

Referring now in particular to the drawings submitted herewith the advertising and customer loyalty system 100 includes providing a server 10 that is a conventional computer server having the necessary electronics to receive, store, transmit and manipulate data. The server 10 includes a database 12 stored thereon. The database is a conventional database that is utilized to store all data associated with the advertising and customer loyalty system 100. It is contemplated within the scope of the present invention that more than one server 10 and database 12 could be utilized for delivery of the advertising and customer loyalty system 100. The server 10 is operably coupled to the Internet via suitable communication protocols and is communicably coupled to a plurality of computing devices 15 having the software application of the advertising and customer loyalty system 100 loaded thereon. It is contemplated within the scope of the present invention that the computing devices 15 could be devices such as but not limited to tablet PC's and smartphones.

Figure 2:
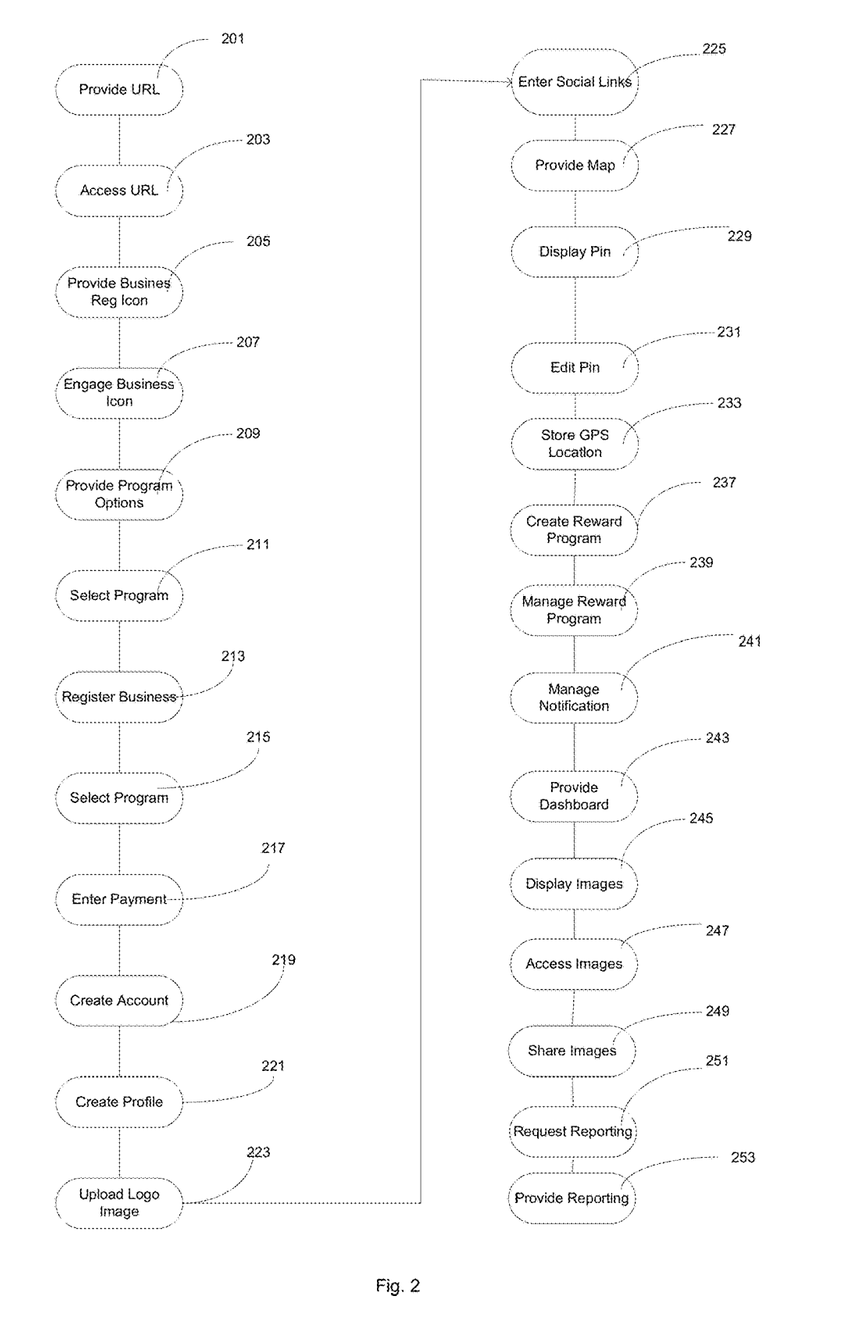
FIG. 2 is a flowchart of the process of registering a business and managing the tasks thereof within the present invention.

Now referring to FIG. 2, a flowchart is illustrated therein providing an overview of the process of registering a business with the advertising and customer loyalty system 100 and managing the tasks thereof. In step 201, the operator of the advertising and customer loyalty system 100 provides a website having a url that is stored on the server 10 and is accessible by computing devices 15. Step 203, a business entity accesses the website utilizing a computing device 15. In step 205, a business registration icon is provided on the website. Step 207, the business will engage the business registration icon to proceed with the registration process. In step 209, at least two program options are provided to the business. As will be further discussed herein, the advertising and customer loyalty system 100 provides programs for businesses to drive customer loyalty through utilization of pictures taken by customers at the business location. The advertising and customer loyalty system 100 provides programs that include features such as but not limited to marketing automation, social media marketing, merchant application. The programs provided to businesses by the provider of the advertising and customer loyalty system 100 further include campaigns and quantities thereof. It should be recognized by those skilled in the art that the programs provided as part of the advertising and customer loyalty system 100 could be vary in features, price and availability.

In step 211, the business will select a program. Step 213, ensuing selecting a program the advertising and customer loyalty system 100 initiates the process of registering the business with the advertising and customer loyalty system 100. In step 215, the business confirms the selection of the selected program. Step 217, the operator of the advertising and customer loyalty system 100 facilitates via the website collection of payment and method for the selected program. In step 219, the business continues creating an account wherein the account information will be stored in the database 12. Step 221, the business enters the necessary parameters to create a profile. The parameters collected to create a profile can include but are not limited to a business name, business address, business website and business phone number. In step 223, the business will upload an image data file. As will be further discussed herein, the image data file will be utilized for incorporation into pictures taken at the location of the business by a customer who is also registered with the advertising and customer loyalty system 100. It is contemplated within the scope of the present invention that the image data file could be but is not limited to a logo image, a motion picture image or an animated graphical image. In step 225, further profile parameters of the business are entered and stored such as but not limited to website links for the social media webpages of the business. Step 227, the advertising and customer loyalty system 100 provides the business a graphical map such as but not limited to a satellite image map of the area proximate the address of the business wherein the data for address of the business has been previously entered. In step 229, a graphical icon such as but not limited to a pin is displayed on the provided graphical map wherein the graphical icon is positioned on the map proximate the address of the business. Step 231, if desired, the business can edit the position of the graphical icon positioned on the map so as to more accurately reflect the geographic location of the business. In step 233, the geographic location of the business is stored as latitude and longitude data in the profile of the business.

In step 237 the software of the advertising and customer loyalty system 100 provides an option for a business to create a reward program to be utilized between the business and registered users of the advertising and customer loyalty system 100. The reward program features and process are further discussed herein. Step 239, a business can access the url of the advertising and customer loyalty system 100 and manage the reward programs that the business has created. It is contemplated within the scope of the present invention that the reward programs and management thereof could include but not be limited to tasks such as defining the reward, identifying qualifications to earn reward, activating and inactivating current reward programs and tracking results of reward programs. In step 241, the business is provided a graphical icon on the website of the advertising and customer loyalty system 100 that facilitate the creation and management of notifications. The creation and management of notifications are further discussed herein. In step 243, ensuing a business accessing the website of the advertising and customer loyalty system 100 and logging in with established username and password, the business is provided a graphical dashboard wherein the graphical dashboard includes but is not limited to image data files of the business or the products of the business wherein the graphical data file were captured and loaded into the advertising and customer loyalty system 100 by a registered user while at the location of the business. Step 245, the image data is displayed to the business and is categorized by user so as to facilitate the ability to ascertain the frequency and/or quantity in which the user captures image data from the location of the business. In step 247, the business can access the image data files so as to provide the ability to execute various tasks therewith. Step 249, the business is provided the ability via the software application of the present invention to share the image data files present in the dashboard via social media, posting on the business website or other electronic techniques. Step 251, the business is provided a graphical icon on the website to access and/or request reports wherein the reports include data such as but not limited to reward program results. In step 253, the business selects at least one report wherein the software of the advertising and customer loyalty system 100 generates and provides the report. It should be understood that the database 12 of the advertising and customer loyalty system 100 could be a relational database or other type database so as to provide reporting for a business.

Figure 3:
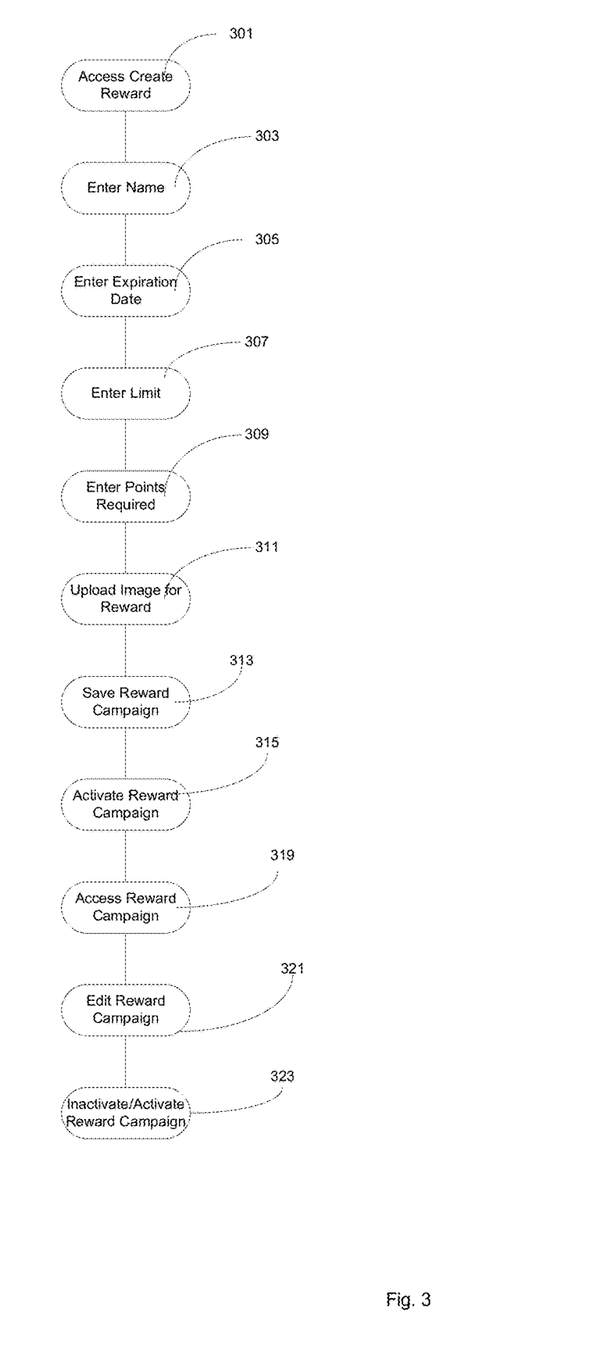
FIG. 3 is a flowchart of the process to create a reward campaign.

FIG. 3 submitted herewith has a flowchart illustrated therein that outlines the process for creating a reward campaign for a business that has registered with the advertising and customer loyalty system 100. It should be understood by those skilled in the art that the steps of entering parameters are facilitated and accomplished through utilization of the software of the present invention and leverage conventional techniques such as but not limited to editable data fields. In step 301, the business accesses the portion of the software of the present invention that facilitates the creation of a reward campaign wherein a reward campaign is offered to the users of the advertising and customer loyalty system 100. Step 303, the business will enter a name for the reward campaign. By way of example but not limitation the campaign reward name could be representative of the reward available. In step 305, the business will enter the expiration date for the reward campaign. Step 307, the business will enter a quantity limit for redemption of the reward. More specifically but not by way of limitation, the business can establish a maximum quantity that a user can redeem the reward provided with a specific reward campaign. It is contemplated within the scope of the present invention that the reward campaign could have limits or be provided without limits.

In step 309, the business will establish the number of points required to earn the reward specified within the reward campaign. As stated herein, a user earns a point for taking a picture of a product or other item associated with the business during a visit to the location of the business and subsequently sharing via a social media platform. While a point system of one point per picture is utilized herein, it is contemplated within the scope of the present invention that other parameters could be utilized in addition to and/or in conjunction with points. Step 311, the business will upload an image data file to be associated with the reward campaign. By way of example but not limitation, if the business is an ice cream store and the reward for the reward campaign is a free ice cream cone, the image data file could be a picture of an ice cream cone. In step 313, ensuing entry of the parameters of the reward campaign, the software of the present invention will save the data parameters associated therewith in database 12 categorically under reward campaigns. In step 315, the business will activate the reward campaign. Step 319, the business will access the reward campaigns stored in the database 12. In step 321, the business can choose to edit either an active reward campaign or an inactive reward campaign. Step 323, a business can inactivate or activate a reward campaign stored in the database 12.

Figure 4:
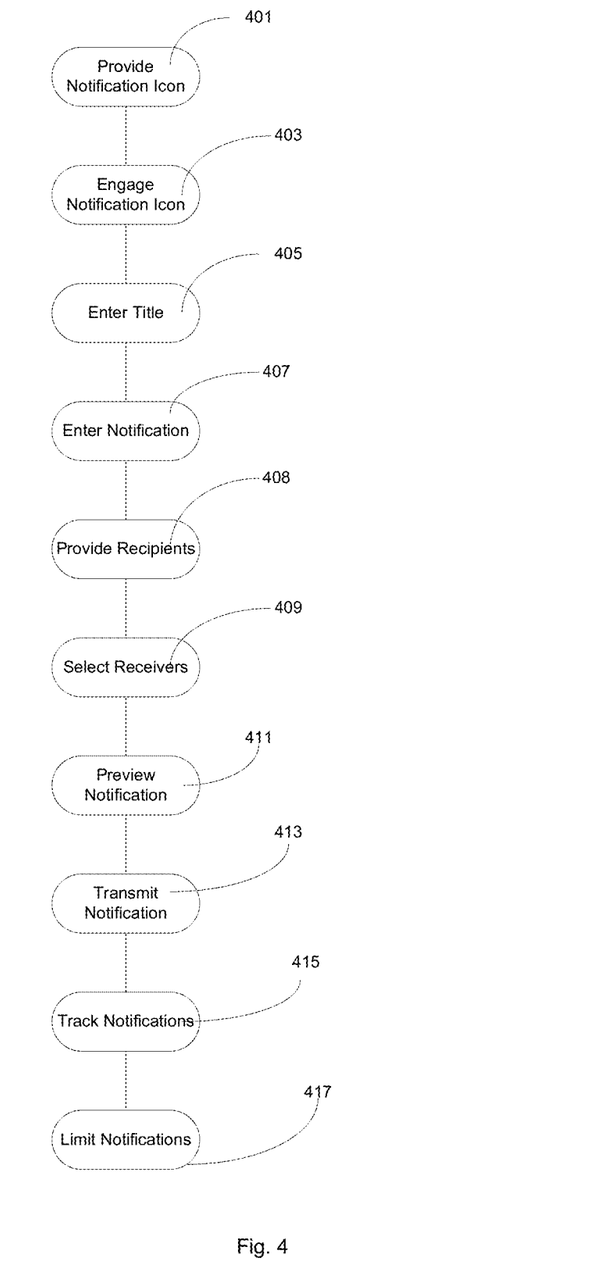
FIG. 4 is a flowchart of an overview of the notification process of the present invention.

Illustrated herein in FIG. 4 is a flowchart of the notification management process of the present invention. In step 401, the operator of the advertising and customer loyalty system 100 provides an icon in the software of the present invention to initiate the management of notifications. The notification process is provided to the businesses registered with the advertising and customer loyalty system 100 wherein the businesses can create and send notifications to customers registered with the advertising and customer loyalty system 100. Step 403, a business will engage the notification icon of the software. In step 405, the title for the notification is entered into a data field. In step 407, the message content for the notification is entered into a data field. By way of example but not limitation, the message content includes information about a special promotion or offer that a business registered with the advertising and customer loyalty system 100 desires to transmit to the registered users of the advertising and customer loyalty system 100. Step 408, the operator of the advertising and customer loyalty system 100 provides a list of recipients to which a notification can be distributed. In step 409, the business will select which recipients to whom the notification will be distributed. It is contemplated within the scope of the present invention that the list of recipients could include but not be limited to: all of the registered users of the advertising and customer loyalty system 100; users who have earned points from the business creating the notification to be transmitted; users who have accumulated a point total that is within a point of earning a reward from that business and users who have visited the business within the last week. In step 411, the business previews the message content of the notification that is to be transmitted to the selected group of users. Step 413, the notification is transmitted to the selected group of users. It is contemplated within the scope of the present invention that the notification is transmitted via conventional methods such as but not limited to SMS text or a message within the software application of the present invention. In step 415, the business tracks the notifications created and transmitted so as to evaluate the effectiveness of the created and transmitted notifications. Step 417, the operator of the advertising and customer loyalty system 100 imposes limits as to the quantity of notifications that a business can create and send within a specified time period.

Figure 5:
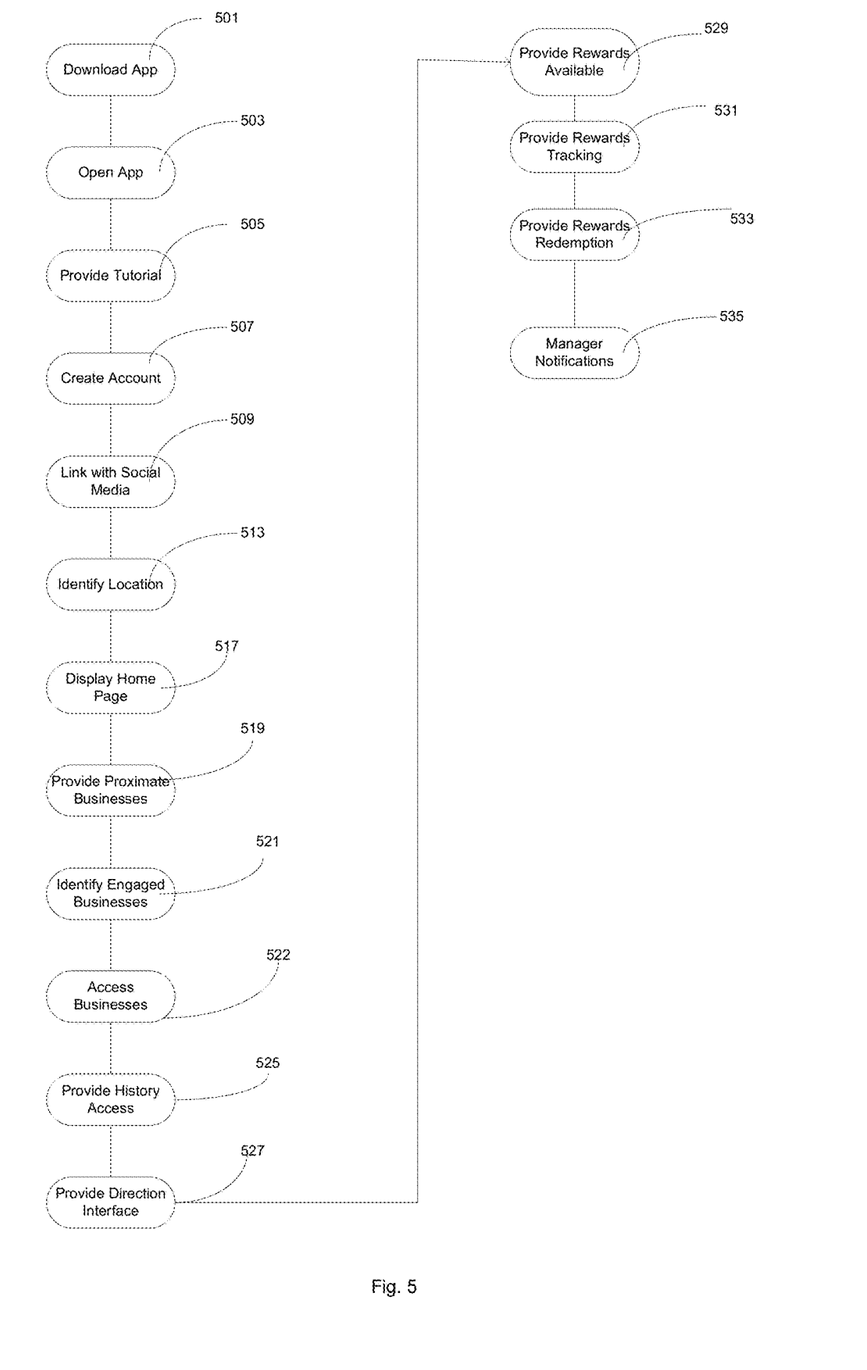
FIG. 5 is a flowchart of an overview of the user features of the present invention.

FIG. 5 submitted herewith has a flow chart illustrated therein that provides a general overview of the features provided by the software of the advertising and customer loyalty system 100 for a user. It should be understood by those skilled in the art that a user is a consumer. In step 501, a user will access the software application of the present invention and download to their computing device 15. Step 503, the downloaded software application of the advertising and customer loyalty system 100 is opened on the user's computing device 15. In step 505, a tutorial introduction is provided to the user upon the initial activation of the software application of the present invention. It is contemplated within the scope of the present invention that the tutorial introduction could be provided to a user upon the initial activation and/or opening of the software application subsequent installation thereof on the computing device of the user. It is further contemplated within the scope of the present invention that a user could bypass the tutorial or access during subsequent uses of the software application of the present invention. In step 507, a user will be prompted to create an account. This step collects conventional information such as but not limited to name, address, demographic details, phone number and email address. Step 509, a user will continue with the account creation process wherein the software application of the present invention will require a communicable link be established with the account of the user of the present invention and the social media accounts of the user such as but not limited to Facebook and Twitter.

In step 513, ensuing activation of the account, the software application of the present invention will identify the geographic location wherein the geographic location is stored and updated during utilization of the software application of the advertising and customer loyalty system 100. Step 517, a home page(main operational screen) is displayed to a user that has completed the account registration process. The main operational screen is the graphical interface for a user to initiate desired operations of the software application of the present invention. Step 519, a user is provided a list of businesses that are geographically proximate to a user wherein the list of businesses are businesses that are registered with the advertising and customer loyalty system 100. Step 521, the businesses identified will have displayed to the user via the software application parameters such as but not limited to a logo, business name, address and points earned if applicable. It is contemplated within the scope of the present invention that the businesses wherein a user has earned at least one point will be displayed in a first color and the businesses wherein a user has not earned a point will be displayed in a second color. In step 522, a user can access more information about a business by selecting one of the businesses listed in step 521 wherein the user is subsequently provided a page displaying the profile information and other details about the business selected.

Step 525, the software application provides to a user access to transactional history wherein the transactional history for a user is stored in the database 12. While listed herein as a task in an exemplary order, it should be understood that the transactional history could be accessed at any time by a user and without executing other additional tasks prior thereto. The transactional history includes information such as but not limited to the frequency of visits, how many points earned by a user from a business and available rewards from a business. In step 527, during viewing of a business profile page as described in step 521, the software application of the present invention provides a direction interface icon operable to engage a map software loaded onto the computing device wherein the direction interface icon is operable to launch a map software so as to assist a user in traversing to the business location. In step 529, the software application of the present invention provides access to rewards available to a user. As discussed herein, a user accumulates points through participation in the advertising and customer loyalty system 100 for taking and subsequently sharing a picture of an object at the location of a business registered with the advertising and customer loyalty system 100. The database 12 of the present invention records and stores each photograph and additionally points earned for the user. This data is accessible via the graphical interface of the software of the present invention and could be accessed by a user independently of the exemplary order of operations outlined in FIG. 5. Step 531, the user is additionally provided with tracking information pertaining to each reward campaign available thereto. More specifically but not by way of limitation, as points are earned by a user, the database 12 records each point earned for each business and makes available to both the user and the business the points earned by a user for a reward campaign. Step 533, ensuing achievement of the points required for a reward campaign, a user will redeem the reward available from the rewards campaign. It should be understood that steps 529-531 are exemplary in order and that any of steps 529-531 could be performed independently and do not need to be executed in the exemplary order of operations outlined herein in FIG. 5. In step 535, the software application of the present invention facilitates the ability to manage notifications received by businesses registered with the advertising and customer loyalty system 100.

Figure 6:
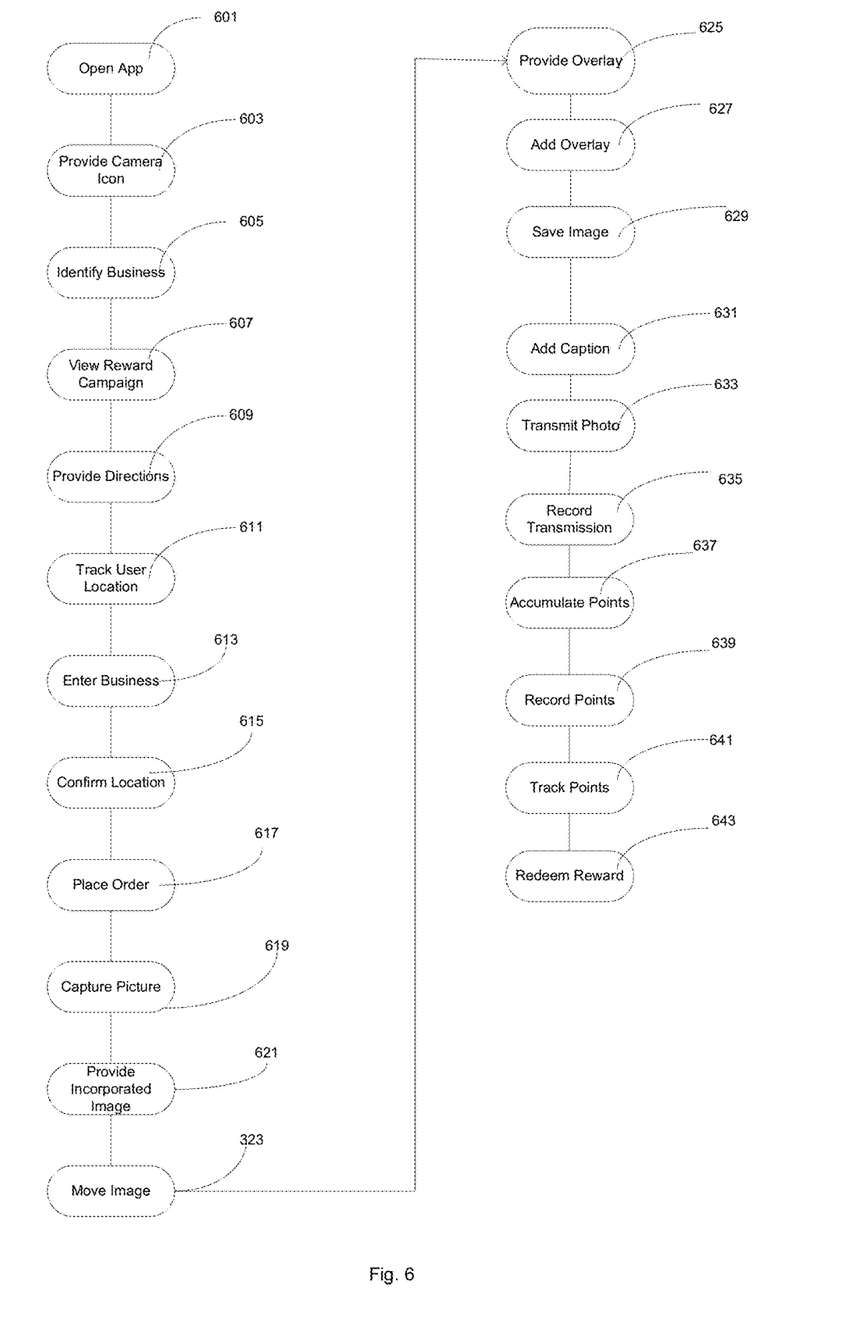
FIG. 6 is a flowchart of an overview of the process of capturing an image for the purpose of earning a reward point.

Illustrated herein in FIG. 6 is an outline of the procedure in which a user will utilize the advertising and customer loyalty system 100 in order to earn a point towards a reward campaign. In step 601, a user will initiate the software application of the present invention on a computing device 15. Step 603, the software application provides a graphical icon on the display of the computing device at all times that is operable to initiate utilization of a camera that is a component of the computing device. In step 605, as previously discussed herein, the user will view businesses registered with the advertising and customer loyalty system 100 that are geographically proximate to the location of the user. It should be understood that a user could additionally search in alternate locations instead of locations that are proximate to their location. Step 607, a user will be provided a list of reward campaigns for each business. User's are further provided any points earned towards available campaigns as a graphical indicia integrated with the display of the available campaigns. In step 609, ensuing selection of a business from a provided list thereof, the software application provides a graphical icon to a map software loaded onto the computing device 15 to operably couple the map software with the software application of the present invention so as to provide directional assistance to travel to the selected business. In step 611, the software of the present invention identifies the geographic location of the present invention and maintains a current record thereof. Step 613, a user will arrive at the selected business. In step 615, the software application of the present invention will prompt for confirmation of the location of the user to ensure the identified geographic location is accurate. By way of example but not limitation, if two adjacent businesses both being registered with the advertising and customer loyalty system 100 are geographically proximate such that accuracy of geographic positioning may indicate location at one business or the other, step 615 allows for input of the correct location. In step 617, the user will order a product and/or service from the business. Step 619, the user will capture a photographic image of either the product, service or other object located within the business that the user is located. In step 621, the software application of the present invention will incorporate an image file into the captured photographic image of the user. The image file is the logo and/or name of the business in which the user is currently located and provided the product or service that was the subject of the photographic image. Step 623, the user will be prompted and allowed to move the incorporated image file in a desired location on the captured photographic image. By way of example but not limitation, if the captured photographic image is that of a plate of food, the ability to move the logo image file ensures proper positioning of the logo image file so as to provide a desirable frame of the subject matter and have the associated logo image file positioned so as to not interfere with the framed subject matter of the photographic image. It is contemplated within the scope of the present invention that the logo image file could be moved utilization an engage and drag type of movement on a touch screen of the computing device 15.

Step 625, ensuing movement of the incorporated image logo file, a user is provided additional options to overlay other images along the border(s) of the captured photographic image. Overlay images are contemplated to include but not be limited to city location or additional business information. A user is not required to select and apply an overlay image. In step 627, if a user has selected an overlay image, the overlay image is applied to the captured photographic image. Step 629, the completed captured photographic image having at least the incorporated image logo file is saved wherein the revised captured photographic image file is saved to the database 12 and/or the computing device 15. It is contemplated within the scope of the present invention that prior to step 629, the software application of the present invention could provide photo enhancement/ alteration of the captured photographic image. This could include but not be limited to enhancing the colors or altering the schematic of the captured photographic image. In step 631, the user is provided a data field wherein a user is allowed to enter text content that will be incorporated with the captured photographic image file as a caption thereto. Step 633, the user transmits the captured photographic image to a social media platform. The transmission of the captured photographic image is executed utilizing conventional communication protocols and it is contemplated within the scope of the present invention that the captured photographic image could be transmitted to more than one social media platform. In step 635, the software application of the present invention records the transmission of the captured photographic image to a social media platform. Step 637, the user is attributed one point towards an active reward campaign of the business that was the subject of the transmitted captured photographic image. In step 639, the accumulated point is recorded and stored in the database and further the accumulated point is added to any previous accumulated points. Step 641, the software of the present invention maintains a record of accumulated points for each user wherein the points record is stored with each user account on the database 12. A user is provided a graphical display of the quantity of the accumulated points earned for a particular business. Step 643, ensuing accumulation of a sufficient quantity of points, a user can redeem the accumulated points for a reward specified as part of a reward campaign.

Figure 7:
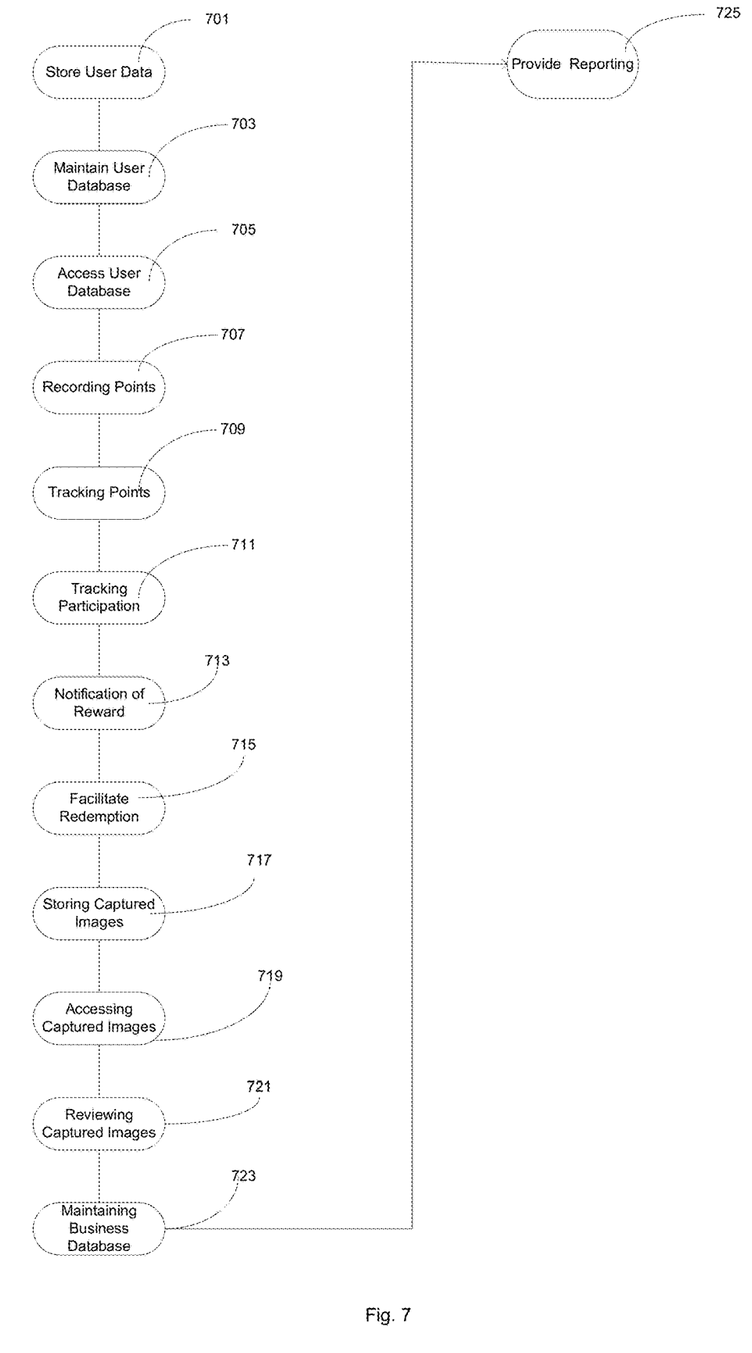
FIG. 7 is a flowchart of an overview of a portion of the administration functions of the present invention.

Illustrated in FIG. 7 herein is an outline of an exemplary administrative process of the advertising and customer loyalty system 100 that is executed by the operator thereof. The process outlined in FIG. 7 herein is exemplary only and it is contemplated within the scope of the present invention that additional execution may be incurred during operation of the advertising and customer loyalty system 100 as has been discussed herein. In step 701, the operator of the advertising and customer loyalty system 100 provides at least one database 12 operably coupled with the server 10. The database 12 is utilized to store all user account information parameters that have been discussed or implied herein. Step 703, the operator will maintain the user information database in accordance with the terms and conditions agreed upon between the operator and the users. Step 705, the operator will access the user database as needed to execute various tasks such as but not limited to provide reports or ensure compliance with the terms and conditions of the advertising and customer loyalty system 100. In step 707, the user database maintains a record of all points earned by each user wherein each point is associated with the user and with the business at which the earned point transpired. In step 709, the software of the present invention will provide tracking of the current point total earned by each user associated with registered business and provide the point total to the business and the user. Step 711, the software of the present invention further provides tracking of the participation rate for a particular reward campaign of a user and provides this information to the pertinent registered businesses. In step 713, the software of the advertising and customer loyalty system 100 as previously discussed herein provides notification to a user upon achievement of accumulation of a sufficient point total to earn a reward designated in a campaign. Step 715, the obtaining of the reward offered by a business as part of a reward campaign is facilitated by the software of the advertising and customer loyalty system 100. In step 717, the advertising and customer loyalty system 100 facilitates the storing of the captured photographic images and the final rendered version thereof on database 12. Step 719, the operator of the advertising and customer loyalty system 100 will access the stored captured photographic images on the database 12. In step 721, the operator will review the stored captured photographic images for compliance with the terms and conditions of the advertising and customer loyalty system 100. If non-compliance is identified, the operator may delete the captured photographic image file. Step 723, the operator further maintains a business database having all of the parameters associated with each business registered with the advertising and customer loyalty system 100. In step 725, the operator will provide access to each registered business or generate on-demand a plurality of reports providing information such as but not limited to user data and reward campaign participation rate.

It is further contemplated within the scope of the present invention that the advertising and customer loyalty system 100 could further provide a catalog of customized or customizable graphical overlays for a consumer to select. These customized or customizable graphical overlays could be made available at a fee or provided gratis to a registered user or business of the advertising and customer loyalty system 100. These graphical overlays could include themes such as but not limited to seasonal themes. It is further contemplated within the scope of the present invention that a catalog of graphical overlays or the captured images could be accessible by third parties based on obtained permissions.

It is further contemplated within the scope of the present invention that the caption field for the captured photographic image could have pre-included text and identifiers such as a # symbol. Additionally, it is contemplated within the scope of the present invention that the software of the present invention could provide a ranking to registered customers and wherein a ranking could be based on parameters such as but not limited to participation.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An advertising and customer loyalty method operable to facilitate an enhanced relationship between businesses and customers comprising the steps of:

providing a server, wherein the server includes the necessary electronics to receive, store, transmit and manipulate data, wherein the server is operably coupled to the Internet;

providing a website, wherein the website is operated on said server, said website providing a user interface to install a software application of the advertising and customer loyalty system;

registering a plurality of businesses, said plurality of businesses having a physical location, wherein during registration of the plurality of businesses a business profile is created and stored in a database operably coupled with said server;

registering a plurality of customers, wherein during registration of the plurality of customers a customer profile for each customer is created and stored in said database, said customer profile containing informational and demographic data about each customer;

installing the software application, wherein the at least one customer installs the software application on a portable computing device;

creating a reward campaign, wherein one of the plurality of businesses creates a reward campaign wherein a business will exchange a reward for a customer that has accumulated a quantity of points;

proceeding to one of the plurality of businesses, wherein one of the plurality of customers traverses to said physical location of the one of the plurality of businesses;

taking a photograph, said photograph being taken by the portable computing device, said photograph having a subject matter relevant to the business where the photograph was taken;

incorporating an image, wherein the software application incorporates an image into the photograph;

moving the image, wherein the software application facilitates the ability to move the image on the photograph so as to place in a desired position;

saving the photograph, wherein the photograph is saved to said database on said server, said photograph being saved with the image being a part thereof;

posting said photograph, said photograph being posted to at least one social media platform utilizing the portable computing device;

earning a point, wherein the customer taking the photograph and posting to at least one social media platform earns a point for posting said photograph to a social media platform; and visiting the business at least one additional time, taking a second photograph, wherein said second photograph is taken with the portable computing device and wherein the second photograph includes subject matter relevant to the business;

posting the second photograph, wherein the second photograph is posted to a social media platform;

earning a second point, said customer earning a second point for posting the second photograph to the social media platform;

earning a reward, said reward being earned by the customer for posting the photograph and the second photograph to the social media platform; and redeeming points, said customer redeeming points earned for a reward at a business with a reward campaign.

2. The advertising and customer loyalty method as recited in claim 1, providing a map, said map having a movable pin logo thereon, wherein said plurality of businesses are able to access said map and move said movable pin logo so as to update the physical location.

3. The advertising and customer loyalty method as recited in claim 2, and further including the step of issuing at least one notification, said at least one notification being transmitted by the software application to the plurality of customers.

4. The advertising and customer loyalty method as recited in claim 3, and further including the step of providing said plurality of customers a list of businesses proximate to a geographical location of the customer, said list of businesses identifying which business has been visited by the customer.

5. The advertising and customer loyalty method as recited in claim 4, wherein businesses visited by a customer is identified in the software application utilizing a color scheme.

6. The advertising and customer loyalty method as recited in claim 5, and further including the step of adding a caption to the photograph, wherein the software application provides the customer a data field to add text to the photograph.

* * * * *